United States Patent [19]

Calcaterra et al.

[11] Patent Number: 5,966,980
[45] Date of Patent: Oct. 19, 1999

[54] METHOD FOR FABRICATING END PLUGS FOR NUCLEAR FUEL RODS

[75] Inventors: Richard Frank Calcaterra, Wilmington; Paul Keith Hoffman, Hampstead, both of N.C.

[73] Assignee: General Electric Company, Schenectady, N.Y.

[21] Appl. No.: 08/313,604

[22] Filed: Sep. 29, 1994

[51] Int. Cl.⁶ .......................... B21D 28/00; B21D 53/00
[52] U.S. Cl. ................................. 72/339; 72/340; 72/203
[58] Field of Search ............................. 72/338–340, 700, 72/203; 140/8, 11; 376/451, 457

[56] References Cited

U.S. PATENT DOCUMENTS

| | | | |
|---|---|---|---|
| 3,699,638 | 10/1972 | Van Dievoet | 376/451 |
| 3,804,708 | 4/1974 | Nilson | 72/700 |
| 4,717,427 | 1/1988 | Morel | 72/365.2 |
| 4,751,045 | 6/1988 | Foster | 376/457 |

FOREIGN PATENT DOCUMENTS 1404234  8/1975  United Kingdom ................... 376/451

*Primary Examiner*—Daniel C. Crane
*Attorney, Agent, or Firm*—Nixon & Vanderhye

[57] ABSTRACT

The process includes hot-forming a large diameter Zircaloy ingot to a flat plate having longitudinal, transverse and depth dimensions and forming blanks in a transverse direction from the flat plate for ultimately forming the end plugs of a nuclear fuel rod. The axis of the end plugs is generally transverse to the longitudinal dimensions of the flat plate whereby centerline defects in the blank are reduced or eliminated. To the extent centerline defects occur, they lie generally transverse to the axis of the end plug whereby the defects are rendered ineffective to form leakage paths through the end plugs.

7 Claims, 2 Drawing Sheets

METHOD FOR FABRICATING END PLUGS FOR NUCLEAR FUEL RODS

TECHNICAL FIELD

The present invention relates generally to methods for fabricating end plugs for nuclear fuel rods and particularly to fabrication methods wherein gas leakage paths through the end plugs resultant from internal material defects are reduced and/or the defects are rendered ineffective to produce fluid leakage paths, e.g., either gas or liquid.

BACKGROUND

Nuclear fuel rods for nuclear reactors typically comprise a plurality of discrete nuclear fuel pellets disposed within a Zircaloy cladding tube. The pellets are stacked within the cladding tube which is then evacuated, back-filled with helium and sealed by welding Zircaloy end plugs at each of the opposite ends of the tube. Typical Zircaloy cladding tubes may have outside diameters, for example, on the order of 0.4–0.5 inches and lengths on the order of 150–160 inches. The end plugs per se, depending on whether they are upper or lower end plugs in use, may have a length of approximately 3½ inches or smaller and a diameter substantially approximating the diameter of the fuel rod cladding.

In the manufacture of end plugs, the Zircaloy material from which the end plugs are formed initially comprises a large diameter ingot, e.g., on the order of 36 inches. By various thermal and mechanical operations, the ingot is reduced down from such large diameter to barstock size, for example, barstock approximating between about 0.25 and 0.75 inches. These thermal and mechanical operations include a substantial number of labor-intensive and costly steps such as a series of forging and reforging operations, extrusions and swaging with reheat therebetween. This reduced barstock is normally provided in random, but long, lengths, on the order of many feet. Once the barstock has been formed, machining operations are performed directly on the barstock to finally shape the end plugs. Typically, the barstock is fed through a chuck on a screw machine and machined directly to the final shape of the end plug. Alternatively, small pieces or blanks can be preformed, e.g., by a forging operation, and the final end plugs formed by a chucking machine.

Prior to forming the end plugs from the barstock material, non-destructive tests are typically performed on the barstock in order to detect and remove internal defects which are a result of and inherent to the previously described thermal and mechanical operations necessary to reduce the ingot from its large diameter to barstock size. Internal defects may also arise on occasion as a result of using contaminated materials, including recycle material. These non-destructive tests may include ultrasonic tests, metallographic tests on the barstock ends or liquid penetrant inspection on the ends of the bars. The purpose of the tests is to detect and identify defects which might provide leakage paths for gas or liquids within the fuel rod cladding once the plugs are welded to the cladding and the fuel rods are charged with helium. Tests for detecting helium leakage paths in barstock, however, have not always detected internal defects which would permit leakage through the end plugs. It is believed that leakage paths, to the extent they occur in the end plugs, are an inherent result of the current methods of reducing of the material from the large-diameter ingot to barstock and particularly the thermal and mechanical operations necessary to do so. This large reduction, including when extruding, tends to provide an axial pipe which can be elongated by swaging, i.e., when squeezing the metal down to the smaller size. Thus, axial or centerline defects occur as a result of the manufacture of the barstock and are carried over into the end plugs manufactured from that barstock. Consequently, end-to-end leakage paths occasionally exist in the final end plugs. While the number of defects is very small in comparison with the number of fuel rods manufactured, the problem addressed by the present invention is to further reduce this rather small failure rate, for example, down to a failure rate of less than one end plug per million fuel rods manufactured.

Moreover, in addition to these technical reasons for reducing the failure rate, the reducing operations typically require a large number of thermal and mechanical operations, as previously described. Those operations require substantial time and labor. Hence, the processing becomes time-consuming, expensive and incurs material loss.

DISCLOSURE OF THE INVENTION

In accordance with the present invention, there is provided a method for forming the end plugs for nuclear fuel rods in a manner which reduces or eliminates centerline defects in the material and leakage paths in the final end plug product. As used herein, the phrase centerline defects does not mean defects limited to the centerline or axis of the material but embraces defects extending in a longitudinal direction not necessarily on the axis of the material. The invention employs a different form, e.g., a flat plate, of the same Zircaloy raw material used previously to form end plugs and from which flat plate blanks for the end plugs are formed and subsequently machined to final shape. The invention also uses a different orientation of the blank relative to any centerline defects formed in the plate whereby any such defects are rendered ineffective as leakage paths in the final end plugs. That is, the occurrence of internal centerline defects in the Zircaloy material is substantially reduced by the present manufacturing method and, additionally, should any such defect occur when the end plugs are manufactured in accordance with the present invention, the defect will be oriented in a different direction which effectively eliminates the defect as a potential leakage path in the end plugs.

As part of the present invention, it has been found that end plug leakage paths are substantially a result of the previously utilized ingot-reducing operations, the centerline defects necessarily inherent from those reducing operations and/or material contamination. The present invention employs a reducing operation which minimizes the occurrence of centerline defects and which orients such defects, should they occur, in a manner which eliminates the defects as leakage paths. Particularly, according to the present invention, the ingot is mechanically formed into rolling stock, then rolled into a flat plate, for example, by hot-rolling. It has been found that flat plate material has fewer longitudinal defects of the type which might form leakage paths when subsequently shaped to form end plugs. Additionally, the blanks from the flat plate material, which ultimately will be finished to form the end plugs, are taken from the flat plate in one of two directions transverse to the extension of the material as it is converted from the ingot to flat plate. That is to say, the Zircaloy ingot is formed, preferably by hot-rolling, into an elongated flat plate having length, width and thickness dimensions. A blank is formed from the plate having a long axis, eventually corresponding to the long axis of the end plug, and which long axis extends perpendicular to the longitudinal or thickness dimensions of the plate. Thus, the longitudinal axis of the end plug lies transverse to any centerline defects that exist in the flat plate material. When the blanks are further formed, e.g., by machining, into end plugs, it will be appreciated that any internal defects arrayed in the longitudinal direction of the raw material will lie in the finished end plugs in an impotent, transverse direction of the end plug effectively precluding a centerline defect from forming a helium or a liquid leak path end-to-end through the end plug. An additional benefit from the foregoing-described process is realized in that the conversion of the Zircaloy ingot to the flat plate is less labor intensive and costly than the conversion of the ingot to the small-diameter barstock in the processes previously utilized.

In a preferred embodiment according to the present invention, there is provided a method of manufacturing end plugs for nuclear fuel rods wherein defects potentially forming leakage paths through the end plugs are minimized, eliminated or rendered ineffective, comprising the steps of forming an ingot of a Zircaloy material into a flat plate having longitudinal and transverse dimensions, forming an elongated blank from the flat plate with a longitudinal dimension of the blank lying generally perpendicular to the longitudinal dimension of the plate and finishing the blank to form an end plug having a longitudinal axis generally parallel with the longitudinal dimension of the blank.

In a further preferred embodiment according to the present invention, there is provided a method of manufacturing end plugs for nuclear fuel rods wherein defects potentially forming leakage paths through the end plugs are minimized, eliminated or rendered ineffective, comprising the steps of hot-rolling an ingot of a Zircaloy material into a flat plate having longitudinal, transverse and thickness dimensions, forming an elongated blank from the flat plate, the blank having a longitudinal axis lying generally perpendicular to one of the longitudinal and thickness dimensions of the plate and machining the blank to form an end plug having a longitudinal axis generally coincident with the longitudinal axis of the blank.

In a still further preferred embodiment according to the present invention, there is provided a method of manufacturing end plugs for nuclear fuel rods wherein defects potentially forming fluid leakage paths through the end plugs are minimized, eliminated or rendered ineffective, comprising the steps of forming an ingot of a Zircaloy material into a flat plate having a material extension direction resultant from the formation of the ingot into the flat plate, forming an elongated blank from the flat plate, the blank having a longitudinal axis lying generally perpendicular to the direction of material extension resultant from the formation of the ingot into the flat plate and machining the blank to form an end plug having a longitudinal axis generally coincident with the longitudinal axis of the blank.

Accordingly, it is a primary object of the present invention to provide novel and improved methods for fabricating end plugs for nuclear fuel rods which reduces the number of internal defects causing leakage paths through the end plugs and/or renders the defects ineffective as leakage paths.

BEST MODE FOR CARRYING OUT THE INVENTION

Figure 1:
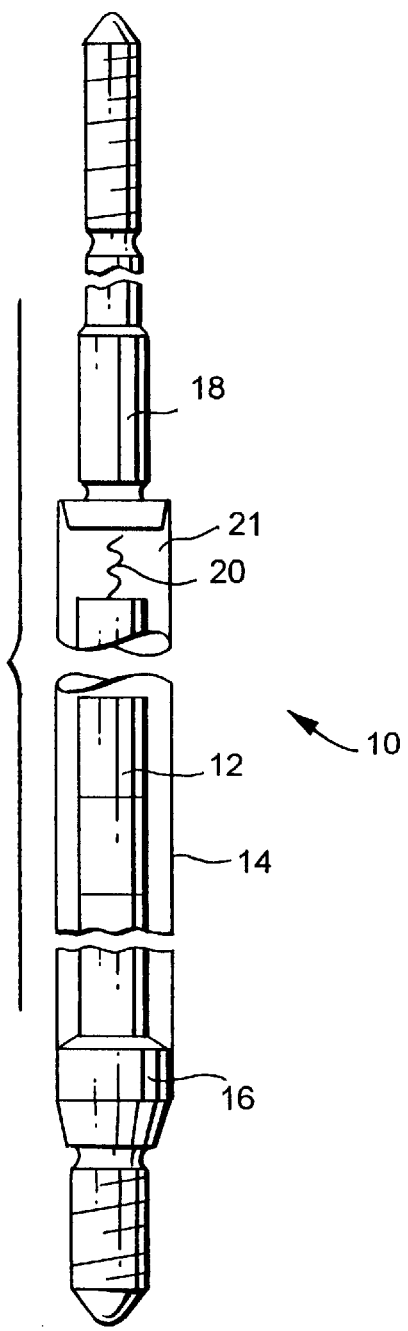
FIG. 1 is a side elevational view with parts broken out and in cross-section illustrating a nuclear fuel rod.

Referring now to FIG. 1, there is illustrated a nuclear fuel rod assembly generally designated 10 comprised of a plurality of nuclear fuel pellets 12, for example, formed of $UO_2$ disposed within a thin walled cladding tube 14. The pellets 12 are stacked one on top of the other in the tube 14 and lower and upper end plugs 16 and 18, respectively, are typically welded to the lower and upper ends of the tube, respectively, to seal the tube. Prior to sealing the ends of the tube, the tube 14 with pellets 12 therein is evacuated and back-filled with helium, the helium being sealed within the tube by the end plugs 16 and 18. A spring 20 is provided in a plenum 21 at the upper end of the tube to exert a downward force on the pellets 12 to maintain the pellets in place during handling procedures. A very small gap is provided between the outer diameter of the pellets and the inner wall surface of the cladding tube.

It will be appreciated that the fuel rod 10 illustrated in FIG. 1 is typically used in an array of fuel rods, for example, an 8×8 or 9×9 array to form a nuclear fuel bundle. The bundle is in turn located between lower and upper tie plates, not shown. The lower end plugs are received in openings in the lower tie plate grid and typically an expansion spring is located over the top end plug to maintain the fuel rods of the bundle seated in the lower tie plate.

Figure 2:
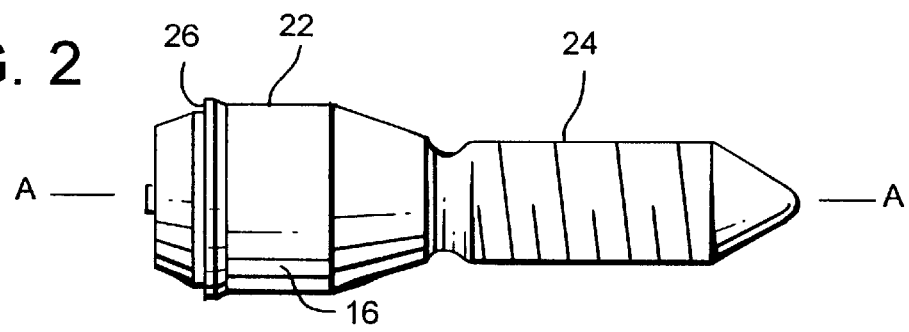
FIG. 2 is an enlarged side elevational view of a representative lower end plug for the fuel rod of FIG. 1.
Figure 3:
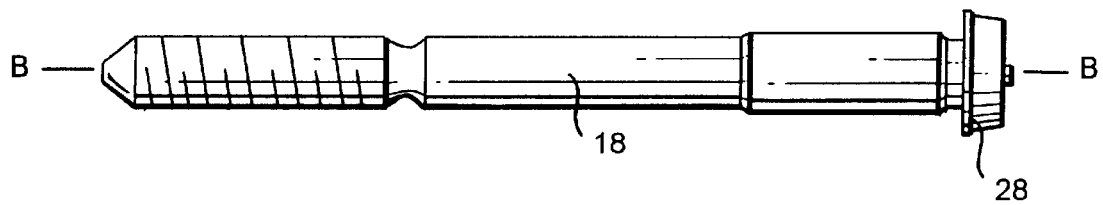
FIG. 3 is a side elevational view of an representative upper end plug for use with the fuel rod of FIG. 1.

Referring now to FIG. 2, lower end plug 16 is illustrated and includes a body portion 22 having a projecting end pin or shaft 24 which may be threaded, a flange 26 about the opposite end, and a reduced boss 27 at such opposite end for disposition within the cladding 14. The lower end plug has a central longitudinal axis along the line A—A in FIG. 2. It will be appreciated that the lower end plug 16 is disposed in the lower end of the tubing 14 with the flange 26 butting the tubing end and welded thereto to seal the lower end of the fuel rod 10. Referring to FIG. 3, a representative example of an upper end plug 18 is illustrated and has an elongated body about a longitudinal axis B—B in FIG. 3. The lower end of the upper plug 18 terminates in a flange 28 and a reduced boss 29. It will be appreciated that the flange and upper end of the tubing are welded one to the other with the plug projecting from the tubing.

Figure 4:
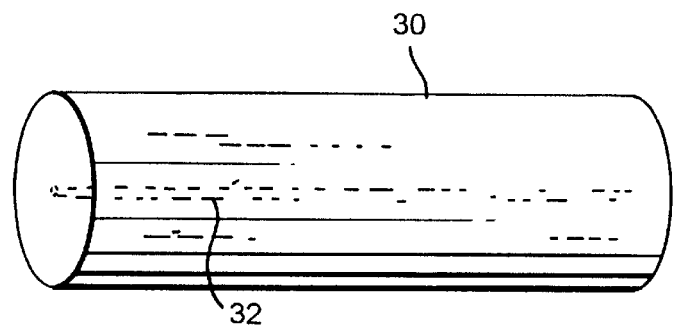
FIG. 4 is a schematic illustration of barstock used previously in the manufacture of end plugs and illustrating centerline axial defects.

Referring now to FIG. 4, there is illustrated a representative example of barstock 30 which has been reduced from a larger ingot size, for example, on the order of 26–30 inches in diameter to a size just larger than or approximating the diameter of the end plugs to be formed from the barstock, for example, within a range of 0.25 and 0.75 inches in diameter. Because of the manufacturing processes and particularly the thermal/mechanical operations necessary to reduce the ingot size to barstock size, the barstock has inherent typically longitudinally extending defects, mostly near the centerline. The dashed lines 32 in FIG. 4 are representative of the centerline defects. It will be appreciated that the defects are of microscopic size and cannot be accurately illustrated in a drawing of this scale. In prior conventional manufacturing processes for forming end plugs, for example, those of FIGS. 2 and 3, the barstock 30 would be machined to form the end plugs. It will also be appreciated that the longitudinal axes of the plugs and the longitudinal axis of the barstock would lie generally coincident with the defects 32 forming potential leakage paths generally parallel to the longitudinal axis of the finished end plug. As a consequence, where those centerline defects appeared, there is the potential for fluid to leak from the finished fuel rod or fluid to enter through the end plugs in a generally axial direction. While the failure rate of end plugs due to helium leakage is very small, for example, on the order of 1 in every 200,000 rods produced, it is important to reduce this failure rate as far as possible.

According to the present invention, this is accomplished by employing a different form of the same raw material previously used to form end plugs to form blanks from which the present end plugs are ultimately formed, for example, by machining. The present invention (i) reduces or eliminates the occurrence of centerline defects in the end plugs, (ii) orients any defects in the end plugs in a manner which is not susceptible or conductive to the formation of centerline fluid leakage paths (which might permit helium gas to escape from the rod or liquid to enter the rod) and (iii) reduces the labor and cost involved in the fabrication of the end plugs.

Figure 5:
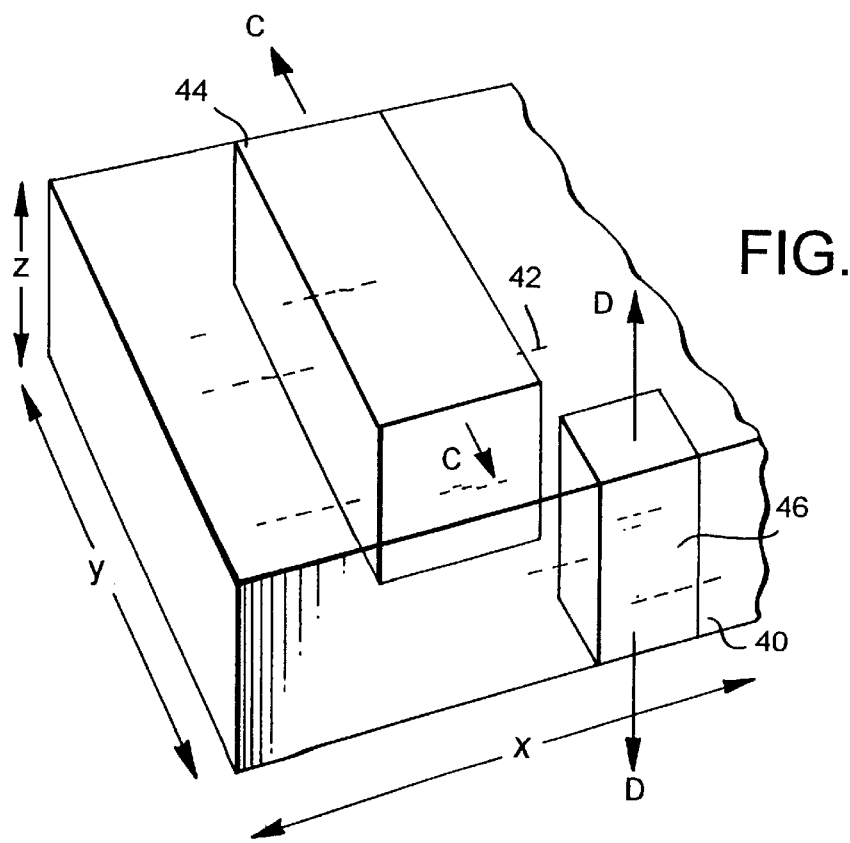
FIG. 5 is a fragmentary perspective view of a flat plate from which blanks for forming end plugs are taken in accordance with the present invention.

In accordance with the present invention, the ingot of raw material, for example, Zircaloy, is formed, preferably by hot-rolling, into an elongated flat plate configuration, for example, the plate 40 partially illustrated in FIG. 5. It will be appreciated from a review of FIG. 5 that plate 40 has longitudinal, transverse and thickness dimensions x, y and z, respectively. By hot-rolling the Zircaloy ingot, centerline defects inherent in the previously used thermal/mechanical processes are reduced in number or eliminated entirely. Should they occur, they are oriented in the longitudinal direction x, for example, at 42 and 43, in the direction of the extension of the material by the forming process.

Once the flat plate 40 is formed to the appropriate thickness, a blank 44 which will ultimately form an end plug, is formed in plate 40 with an axial direction C—C of the blank corresponding in direction to the axis A—A or B—B of the final machined end plug. Thus, blank 44 illustrated in FIG. 5 may be machined, cropped, stamped or cut from the plate 40 in a transverse direction y whereby the axis C—C of the blank is generally orthogonally related to the longitudinal and thickness dimensions x and z and generally parallel to the transverse direction y of the flat plate 40. Alternatively, a blank 46 may be machined, cropped, stamped or cut from plate 40 in a direction such that the axis D—D of the blank is generally parallel to the thickness dimension z and orthogonal and transverse directions x and y, respectively. By hot-rolling the ingot, any defects in the ingot will appear in the longitudinal dimension x, as illustrated by the dashed lines 42 and 43. Consequently, the likelihood of a centerline defect appearing in a direction which would produce a fluid leakage path in the final end plug is reduced. Moreover, to the extent any such defect exists in the final product, it extends generally transversely of the end plug and not longitudinally thereof and thus is generally not available to form a leakage path between opposite ends of the end plug.

Once having formed the blank 44, the blank may be machined to the final end plug configuration. The axis of the end plug, either A—A or B—B, will, of course, lie coincident with or parallel to the axis C—C of the blank 44 taken from plate 40 or the axis D—D of the blank 46 taken from the plate 40. The blanks may, of course, be taken from the flat plate at angles other than orthogonal angles provided only that the centerline of the end plug is generally perpendicular to the direction of material extension when forming the plate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing end plugs for nuclear fuel rods comprising the steps of:
    minimizing, eliminating or rendering ineffective defects forming fluid leakage paths through the end plugs by:
        (i) forming an ingot of a Zircaloy material into a flat plate having longitudinal and transverse directions by hot-rolling said ingot to produce said flat plate;
        (ii) forming an elongated blank from said flat plate with a longitudinal dimension of the blank lying generally perpendicular to the longitudinal dimension of the plate; and
        (iii) finishing the blank to form an end plug having a longitudinal axis generally parallel with the longitudinal dimension of the blank.

2. A method according to claim 1 wherein the plate has orthogonally related, longitudinal, transverse and thickness dimensions, and including the step of forming the blank from the flat plate with a longitudinal axis of the blank lying generally parallel to the thickness dimension of the plate.

3. A method according to claim 1 wherein the plate has orthogonally related, longitudinal, transverse and thickness dimensions, and including the step of forming the blank from the flat plate with a longitudinal axis of the blank lying generally parallel to the transverse dimension of the plate.

4. A method according to claim 1 including forming the blank with a longitudinal axis thereof lying transverse to the direction of the roll when hot-rolling said ingot.

5. A method according to claim 1 wherein the step of finishing includes mechanical forming by one of swaging, rotary forging or drop forging to shape said blank and form the end plug.

6. A method of manufacturing end plugs for nuclear fuel rods comprising the steps of:
    minimizing, eliminating or rendering ineffective defects forming fluid leakage paths through the end plugs by:
        (i) hot-rolling an ingot of a Zircaloy material into a flat plate having longitudinal, transverse and thickness dimensions;
        (ii) forming an elongated blank from said flat plate, said blank having a longitudinal axis lying generally perpendicular to one of the longitudinal and thickness dimensions of the plate; and
        (iii) machining the blank to form an end plug having a longitudinal axis generally coincident with the longitudinal axis of the blank.

7. A method of manufacturing end plugs for nuclear fuel rods comprising the steps of:
    minimizing, eliminating or rendering ineffective defects forming fluid leakage paths through the end plugs by:
        (i) forming an ingot of a Zircaloy material into a flat plate having a material extension direction resultant from the formation of the ingot into the flat plate;
        (ii) forming an elongated blank from said flat plate, said blank having a longitudinal axis lying generally perpendicular to the direction of material extension resultant from the formation of the ingot into the flat plate;
        (iii) machining the blank to form an end plug having a longitudinal axis generally coincident with the longitudinal axis of the blank; and
        (iv) wherein the step of forming the flat plate includes hot-rolling the ingot in a roll direction corresponding to the direction of the material extension.

* * * * *